United States Patent Office 2,846,440
Patented Aug. 5, 1958

2,846,440

COMPOSITION FOR AND METHOD OF INHIBITING CORROSION OF METALS

William B. Hughes, Webster Groves, Mo., assignor to Cities Service Research and Development Company, New York, N. Y., a corporation of New Jersey No Drawing. Application December 12, 1955
Serial No. 552,261

7 Claims. (Cl. 260—309.6)

This invention relates to inhibiting corrosion of metals, and more particularly relates to an improved composition and process for the prevention of corrosion in natural gas production, collection and distribution systems.

In the production of natural gas, and especially when the producing wells are high pressure wells of the type generally known as gas-condensate wells, some water, along with condensible hydrocarbon fluids, tends to condense out of the gas and coat the walls of the gathering and distribution lines. When carbon dioxide or traces of organic acids are present in the gas as it generally the case, they tend to dissolve in the condensed water to form highly corrosive solutions which rapidly eat their way through the lines.

Various methods have been proposed in the past for controlling this type of corrosion. In larger systems such as main gas lines it has sometimes been found profitable to install gas dryers, but the expense of installing such dryers is usually prohibitive in smaller systems, especially in gas collecting lines where the corrosion problem is most acute. In such lines certain chemical inhibitors have been found to be of some use, but even the best of the inhibitors now commercially available have not proven entirely satisfactory. While they do reduce corrosion to some extent, even with their use corrosion continues to such an extent as to pose a serious economic problem.

I have now discovered that corrosion of the type described can be substantially inhibited by introducing into the production, collection and distribution lines a small but sufficient quantity of an imidazoline-imidazolidine compound which has been reacted with from 1 to 2 mols of ethylene oxide. The intermediate imidazoline-imidazolidine compound is obtained by first reacting a polyethyleneamine selected from the group comprising triethylene tetramine and tetraethylene pentamine with an equimolar quantity of a monocarboxylic acid having from 2 to about 20 carbon atoms. The imidazoline product of this reaction is then further reacted with an equimolar amount of an aldehyde having from 1 to about 15 carbon atoms to provide the intermediate imidazoline-imidazolidine reaction product. This intermediate reaction product is further reacted with from 1 to 2 mols of ethylene oxide to provide the new compounds which I have found to possess unexpectedly superior corrosion inhibiting properties. Among the aldehydes which I have found to be particularly satisfactory are formaldehyde, heptaldehyde, butyraldehyde, and benzaldehyde.

In preparing the new compositions which I have found to be most effective corrosion inhibitors, 1 mol of the polyethyleneamine is reacted with the monocarboxylic acid in the presence of toluene or benzene to provide an azeotrope which permits the removal of water from the reaction mixture. After the removal of 2 mols of water, representing the amount theoretically obtainable by reacting the acid carboxyl group with the amine groups of the polyethyleneamine, an imidazoline ring is obtained. Among the acids which I have found to be particularly satisfactory in producing the imidazoline structure are oleic, benzoic, palmitic, and ricinoleic. In addition, acids such as valeric, caproic, heptoic, octanoic, nonoic, lauric, myristic, stearic, and linolenic can be used. In order to obtain the intermediate imidazoline-imidazolidine reaction product, the imidazoline obtained by the reaction of the polyethyleneamine and monocarboxylic acid is then reacted with 1 mol of an aldehyde, with water being removed as an azeotrope similar to the initial reaction which produces the imidazoline ring. If the polyethyleneamine used is triethylene tetramine, the intermediate product will have the following structure:

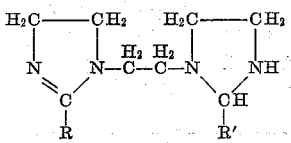

If, on the other hand, the polyethyleneamine is tetraethylene pentamine, the intermediate imidazoline-imidazolidine will have the following structure:

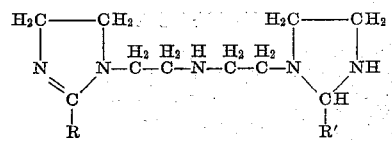

In the foregoing formulas, R represents the acid residue of the monocarboxylic acid used in preparing the imidazoline portion of the intermediate imidazoline-imidazolidine structure. R' represents the aldehyde residue used in preparing the imidazolidine portion of the imidazoline-imidazolidine structure. It is, of course, understood that if desired the imidazolidine portion of the imidazoline-imidazolidine structure can be prepared first, with the imidazoline being thereafter prepared by reacting the imidazolidine with the monocarboxylic acid. In order to obtain the new compounds of my invention, the imidazoline-imidazolidine intermediate product is reacted with ethylene oxide under conditions which permit the addition of the ethylene oxide to the imidazoline-imidazolidine structure, presumably on the hydrogen attached to the number 3 nitrogen in the imidazolidine ring. It is, of course, known from the chemistry of ethylene oxide reactions that additional molecules of ethylene oxide could be added. However, increasing the length of the ethylene oxide chain by the addition of more than 2 mols has an undesirable effect on the solubility of the original product.

In order to more fully understand the nature of the compounds of my invention and the method by which they are prepared, the following examples are provided:

EXAMPLE 1

To 186 grams (1.0 mol) of tetraethylene petamine 280 grams (1.0 mol) of oleic acid were added. To the mixture, 50 ml. of toluene were added to form a water toluene azeotrope. The reaction mixture was charged to a reactor equipped with a decanter still-head and a reflux condenser. The reaction mass was heated to a temperature of about 80° to 100° C. in order to remove water which was collected in a water trap while the toluene was continuously returned to the reactor. At the end of a five hour reaction period, 36 grams of water had been removed. The reaction mass was then cooled to room temperature, and 30.3 grams (1.0 mol) of paraformaldehyde (99% HCHO) were carefully added with stirring in order that heat of reaction would be dissipated. The reaction mixture was returned to the reflux condenser and heated for another six hour period. At the end of this time, 17.8 grams of water had been removed from the reaction mixture. Toluene was then removed from the reaction zone by distillation. The resulting semi-solid product, representing the intermediate imidazoline-imidazolidine compound, was brown in color, oil soluble, and found to have a molecular weight of 439, as compared to a theoretical molecular weight of 442.

43.9 grams (0.1 mol) of the above described intermediate product were then dissolved in 100 ml. of isopropyl alcohol. Gaseous ethylene oxide was then slowly bubbled into the reaction mixture at a rate to minimize the sharp increase in temperature due to the reaction of the ethylene oxide and imidazoline-imidazolidine intermediate product. At the end of a 2½ hour reaction period, the temperature of the mixture had returned to normal, and ethylene oxide was no longer being dissolved by the reaction mixture. The isopropyl alcohol solvent was then removed by distillation, leaving a clear brown product which was completely soluble in water. The molecular weight of the final product was 528, indicating that approximately 2 mols of ethylene oxide had been added to the intermediate imidazoline-imidazolidine product.

The final reaction product was tested as a corrosion inhibitor and is identified as inhibitor number 2 in the table which follows, wherein comparative results of the protection provided by my new compounds are recorded.

EXAMPLE 2

Following the procedure set forth in Example 1, 146 grams (1.0 mol) of triethylene tetramine were reacted with 280 grams (1.0 mol) of oleic acid. After the removal of 2 mols of water, the imidazoline compound obtained was further reacted with 1 mol of formaldehyde, with 1 mol of water being removed at the end of the reaction period to provide an intermediate imidazoline-imidazolidine product having a molecular weight of 402. 40.2 grams of the intermediate product were then treated with ethylene oxide, and at the end of the reaction period, indicated by no further dissolving of ethylene oxide, a final product was separated. This product was a clear, light brown liquid which was completely soluble in water and had a molecular weight of 491, indicating that 2 mols of ethylene oxide had been added thereto. The results of tests of the protection provided by the final reaction product herein are recorded in the table which follows. This compound is identified as corrosion inhibitor number 6 therein.

EXAMPLE 3

Following the procedure set forth in Example 1, 186 grams (1.0 mol) of tetraethylene pentamine were added to 80 grams (1.0 mol) of oleic acid in the presence of 50 ml. of toluene. After the removal of 2 mols of water, the imidazoline compound was reacted with 114 grams (1.0 mol) of heptaldehyde. After the removal of 1 mol of water, the intermediate imidazoline-imidazolidine compound was obtained. This product was a brown liquid, oil soluble, and had a molecular weight of 526. This intermediate product was treated in the usual manner as described above with 2 mols of ethylene oxide to produce a brown, water soluble product which is oil dispersible and had a molecular weight of 622. The theoretical molecular weight for the intermediate imidazoline-imidazolidine compound having added thereto 2 mols of ethylene oxide is 614. The result of tests of protection provided by this product are recorded in the table which follows, the intermediate and final reaction products being identified as inhibitors number 3 and 4 respectively.

The effectiveness of my new compounds in reducing the corrosion in natural gas production, collection and distribution systems may be more fully understood by reference to certain tests which I have conducted, using prepared acidic brines which substantially duplicate well conditions. The test procedure involved a measurement of the corrosive action of the hypothetical well fluid as inhibited with my new compounds described above upon weighed, cleaned and polished strips of number 18 gauge cold rolled steel measuring one-quarter inch by four inches, under conditions closely approximating conditions existing in a producing well and a comparison thereof with the results obtained by subjecting identical strips to the corrosive action of my hypothetical well fluid without inhibitor added.

The tests which I have conducted may be either of a dynamic or static type. In carrying out tests of the new compounds described herein, the dynamic method was used. In this method, an apparatus was utilized which dips the test panels alternately through two phases of the corrosive medium at a rate of three times per minute. The corrosive medium was held in a one liter three neck round bottom flask equipped with a heater, mercury sealed stirrer, a reflux condenser, and means for passing gas into the bottom of the corrosive medium. The stirrer was replaced by a glass hook adapted to carry the test strip. The test hook was driven by a small electric motor through a cam arrangement.

The hypothetical corrosive medium comprised a 5 weight percent solution of sodium chloride to which had been added 0.2 ml. of a mixture of 50 weight percent formic acid and 50 weight percent acetic acid. To this acid mixture a varying amount of kerosene was added (10 to 400 ml.) and carbon dioxide or natural gas was allowed to pass through the mixture during the test. The variation of kerosene volume allowed tests to more nearly simulate conditions existing either in a condensate well or those existing in a gas pipe line.

In carrying out the test, the corrosive medium was heated to boiling and the gas introduced. A punched, cleaned, weighed test panel was suspended on the glass hook and the dipping process started and allowed to continue for 90 minutes. At the end of this time, the test panel was removed, cleaned, dried, and weighed to give a blank loss.

The inhibitor was introduced into the corrosive medium and the test conducted on a comparative weighed test strip for an additional 90 minutes. At the end of this time, the test strip was again cleaned and weighed to give an inhibited test loss. The changes in weight of the test strips during the tests are taken as a measurement of the effectiveness of the inhibitor being used.

A percentage protection afforded by the respective compound being tested may be calculated for each inhibitor in accordance with the following formula:

$$\frac{L1 - L2}{L1} \times 100 = \text{percent protection}$$

in which L1 is the loss in weight of the strips taken from the uninhibited test, and L2 is the loss in weight of the strips taken from the inhibited test.

Since it is important that the test strips be free of contaminants, cleaning of the strips is an important feature of this test. Normally in cleaning, the test strip, after contact with the corrosive fluid either with or without inhibitor, is washed in kerosene, then in methanol, and finally washed with water prior to acid cleaning. The acid cleaning consists of treating the test strip in a 1 weight percent hydrochloric acid solution for a few seconds, washing with water, and thoroughly wiping with cheesecloth. The acid treatment is repeated several times until the original luster of the test strip is obtained as nearly as possible with a minimum amount of acid treating. After acid treating was completed, the strips were again washed in methanol, followed by acetone, and were then reweighed to determine the weight loss.

The effectiveness of the described test method in comparing the protection provided by the new compounds of my invention will be apparent from the table which follows, in which comparative results are recorded in terms of percent protection for 50 and 100 p. p. m. of the respective compounds. It will be noted that a comparison is provided for the intermediate imidazoline-imidazolidine compound, with the final reaction product having added thereto the ethylene oxide. In all cases, it will be noted that superior results, that is, greater protection, are provided by the addition of ethylene oxide to the intermediate reaction product.

Table

| Number | Inhibitor | Mol Ratio | Dynamic Test— Percent Protection | |
|---|---|---|---|---|
| | | | 50 p. p. m. | 100 p. p. m. |
| 1 | TEPA, Oleic, HCHO | 1:1:1 | 79.8 | 90.2 |
| 2 | TEPA, Oleic, HCHO Etoxide | 1:1:1:2 | 88.8 | 99.0 |
| 3 | TEPA, Oleic, Hept [1] | 1:1:1 | 83.4 | 91.6 |
| 4 | TEPA, Oleic, Hept Etoxide | 1:1:1:2 | 89.0 | 99.3 |
| 5 | TETA, Oleic, HCHO | 1:1:1 | 94.9 | 95.9 |
| 6 | TETA, Oleic, HCHO Etoxide | 1:1:1:2 | 98.9 | 99.0 |
| 7 | TEPA, ACCHO [2] BzCOOH [3] | 1:1:1 | 40.1 | 88.4 |
| 8 | TEPA, ACCHO BzCOOH Etoxide | 1:1:1:2 | 78.3 | 90.2 |

[1] Heptaldehyde.
[2] Acetaldehyde.
[3] Benzoic acid.

It will be evident from the foregoing table that corrosion may be effectively reduced to a value of one-tenth or less of that due to the natural flow of corrosive fluids through well tubing and pipe lines by incorporating in the system a comparatively small amount of the improved compounds of my invention.

While the tests were conducted with amounts of inhibitor amounting to 50 or 100 p. p. m. for comparison purposes, more or less inhibitor may be used, depending on the corrosiveness of the aqueous phase present in the well and pipe line. In actual use in the field, the concentration of inhibitor must, of course, be adjusted to the particular conditions existing therein, provided only that the inhibitor is introduced in an amount sufficient to substantially inhibit corrosion. I have found that excellent results are obtained by dissolving the inhibitor in an appropriate amount of water in order to better control the amount of inhibitor used and injecting the inhibitor solution into the well or into the transfer lines as near to the well head as possible. The gas current flowing through the lines is then effective to mix the inhibitors with the corrosive fluids present and to sweep the inhibitor throughout the system, affording protection to all metal equipment with which it comes in contact after the point of injection.

It is to be understood that the improved compositions of my invention are not limited to use alone and may be applied along with other agents commonly introduced into wells and pipe lines for breaking emulsions, preventing scale formations, minimizing pitting, etc. It is further evident that my invention is not restricted to the use of my improved compositions for inhibiting corrosion in oil and gas wells and associated equipment, but may be employed to perform this function in the presence of corrosive fluids derived from many other sources.

Having now described my invention, what I claim as new and useful is:

1. As a new composition of matter, the compound prepared by first condensing one mol of a polyethyleneamine selected from the group consisting of triethylene tetramine and tetraethylene pentamine with one mol of a mono-carboxylic acid having from 2 to about 20 carbon atoms by removing two mols of water from the reaction mixture by distillation to provide an intermediate imidazoline reaction product, condensing said intermediate imidazoline reaction product with one mol of an aldehyde having from 1 to about 15 carbon atoms by removing 1 mol of water from the reaction mixture by distillation to provide an intermediate imidazoline-imidazolidine reaction product having the formula

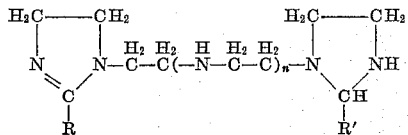

wherein $n$ is an integer from 0 to 1, and introducing into the imidazoline-imidazolidine reaction product from 1 to 2 mols of ethylene oxide.

2. A new composition of matter as claimed in claim 1, wherein the polyethyleneamine is triethylene tetramine and $n=0$.

3. A new composition of matter as claimed in claim 1, wherein the polyethyleneamine is tetraethylene pentamine and $n=1$.

4. The process of reducing corrosion of metals when exposed to corrosive fluid which comprises incorporating in the corrosive fluid a small but sufficient quantity of the reaction product prepared by first condensing one mol of a polyethyleneamine selected from the group consisting of triethylene tetramine and tetraethylene pentamine with one mol of a mono-carboxylic acid having from 2 to about 20 carbon atoms by azeotropically distilling two mols of water from the reaction mixture to provide an intermediate imidazoline reaction product, condensing the intermediate imidazoline reaction product with one mol of an aldehyde having from 1 to about 15 carbon atoms by azeotropically distilling one mol of water from the reaction mixture to form an intermediate imidazoline-imidazolidine reaction product having the formula

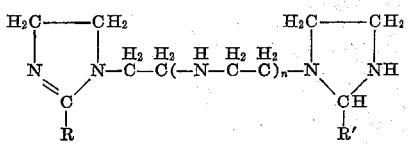

wherein $n$ is an integer from 0 to 1, introducing into the intermediate imidazoline-imidazolidine reaction product from 1 to 2 mols of ethylene oxide, and thereafter causing the corrosive fluid to flow in contact with the metal to be protected.

5. The process according to claim 4, in which the monocarboxylic acid is oleic acid, and the aldehyde is formaldehyde.

6. The process according to claim 4, in which the monocarboxylic acid is oleic acid and the aldehyde is heptaldehyde.

7. The process according to claim 4, in which the monocarboxylic acid is benzoic acid and the aldehyde is acetaldehyde.

References Cited in the file of this patent
UNITED STATES PATENTS

| 2,211,001 | Chwala | Aug. 13, 1940 |
| 2,643,227 | Hughes | June 23, 1953 |
| 2,643,978 | Hughes | June 30, 1953 |